(12) United States Patent
Sareen et al.

(10) Patent No.: US 7,730,058 B2
(45) Date of Patent: Jun. 1, 2010

(54) SEARCHING FOR INFORMATION UTILIZING A PROBABILISTIC DETECTOR

(75) Inventors: Gaurav Sareen, Bellevue, WA (US); Mark Steven Manasse, San Francisco, CA (US); Martin Abadi, Palo Alto, CA (US); Michael A. Isard, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 189 days.

(21) Appl. No.: 11/243,924

(22) Filed: Oct. 5, 2005

(65) Prior Publication Data

US 2007/0078827 A1    Apr. 5, 2007

(51) Int. Cl.
    *G06F 7/00*      (2006.01)
    *G06F 17/30*      (2006.01)

(52) U.S. Cl. .................. 707/721; 707/705; 707/736; 707/769

(58) Field of Classification Search .................. 707/3
See application file for complete search history.

(56) References Cited

U.S. PATENT DOCUMENTS

| | | | | | |
|---|---|---|---|---|---|
| 5,701,464 | A | * | 12/1997 | Aucsmith | 707/10 |
| 5,890,156 | A | * | 3/1999 | Rekieta et al. | 707/10 |
| 6,009,271 | A | * | 12/1999 | Whatley | 717/127 |
| 2003/0005036 | A1 | * | 1/2003 | Mitzenmacher | 709/203 |
| 2003/0208665 | A1 | * | 11/2003 | Peir et al. | 711/169 |
| 2004/0243828 | A1 | * | 12/2004 | Aguilera et al. | 713/200 |
| 2005/0022009 | A1 | * | 1/2005 | Aguilera et al. | 713/201 |
| 2005/0108368 | A1 | * | 5/2005 | Mohan et al. | 709/220 |
| 2005/0120004 | A1 | * | 6/2005 | Stata et al. | 707/3 |
| 2005/0174272 | A1 | * | 8/2005 | Cadambi et al. | 341/106 |
| 2006/0294311 | A1 | * | 12/2006 | Fu et al. | 711/118 |

OTHER PUBLICATIONS

Bloom, B.H., "Space/Time Trade-offs in Hash Coding with Allowable Errors", Communications of the ACM, vol. 13, No. 7, Jul. 1970.*
Siberschatz et al., "Operating System Concepts", 1999, Wiley, 5th Edition, pp. 36-37, 417.*

* cited by examiner

*Primary Examiner*—Vincent Boccio
*Assistant Examiner*—Huen Wong
(74) *Attorney, Agent, or Firm*—Woodcock Washburn LLP

(57) ABSTRACT

A probabilistic detector is utilized to query a database. Utilization of a probabilistic detector provides assurance with 100 per cent probability that a search expression in the query is not in the database index. The probabilistic detector is implemented in the form of a Bloom filter. The probabilistic detector is created by hashing expressions in the database index and mapping the resulting hash values into the probabilistic detector. Upon receiving a query, expressions of the query are hashed. The probabilistic detector is queried using these hash values. If the results of querying the probabilistic detector indicate that searched for information may be in the database, the database is not queried. If the results of querying the probabilistic detector indicate that the information may be in the database, the database is queried for the information using the original query. This technique is advantageous in mitigating detrimental effects of denial of service attacks.

16 Claims, 5 Drawing Sheets

SEARCHING FOR INFORMATION UTILIZING A PROBABILISTIC DETECTOR

TECHNICAL FIELD

The technical field generally relates to data searches and more specifically relates to preventing unnecessary data searches and improving search performance.

BACKGROUND

Searching for information, over a network for example, can be time consuming and computationally intensive. A typical search on the Internet could involve several hundred database servers. Denial of service attacks can be frustrating for users and developers of search systems. Denial of service attacks can be implemented in various ways. A denial of service attack can corrupt system hardware and/or software or can interfere with routing information. A denial of service attack also can prevent users from using systems by overloading resources. For example, a search engine can be overloaded if the system is bombarded with requests for information that can not be found. In an attempt to find the requested information, the system searches its entire memory structure, (e.g., disk memory or databases connected to the Internet), each time it is queried. Because the system is busy searching for nonexistent information, the system response time is considerably slowed down. Denial of service attacks also can prevent search systems from responding to additional requests. A user of a search system under a denial of service attack may think the search system itself is faulty. This can lead to reduced use of a provider's product, resulting in reduced revenue and possible tarnish of the provider's good name.

SUMMARY

To search for information, a probabilistic detector is queried to determine the likelihood, of the desired information being found. If the results of querying the probabilistic detector indicate that the information being searched for will not be found, the information is not searched for. If the results of querying the probabilistic detector indicate that the information may be found, the information is queried for. The probabilistic detector is implemented in the form of a Bloom filter. Hash values are calculated based on available information. The probabilistic detector is populated with these hash values. When a query is received, hash values are calculated based on the query. The probabilistic detector is queried using the hash values based on the query. If no match is found, then it is certain that the queried for information was not used to create the probabilistic detector, and thus will not be found. If a match is found, than the information is queried for. The queried for information may or may not be found with a probability that is dependent upon the complexity of the probabilistic detector.

BRIEF DESCRIPTION OF THE DRAWING

The foregoing and other objects, aspects and advantages will be better understood from the following detailed description with reference to the drawings, in which.

DETAILED DESCRIPTION OF ILLUSTRATIVE EMBODIMENTS

In an exemplary embodiment, a probabilistic detector, such as a Bloom Filter for example, is utilized to facilitate a search for information. A probabilistic detector is created based on the information associated with (e.g, an index) a storage entity, or entities, to be searched. The entity to be searched can include any appropriate entity, such as a disk, a database, semiconductor memory, a network, or a combination thereof. By way of example, a database is described as an entity to be searched. However, it is to be understood, that other entities are applicable. Utilization of the probabilistic detector as described herein provides a searcher the ability to make a decision, based on a probability, whether to search the database or not.

In an exemplary scenario, a database comprises a database index containing a list of expressions stored in the database. An expression can comprise a term, a phrase, a word, a sequence of musical notes, a representation of multi-media, an address, or the like, or any combination thereof. The probabilistic detector is based on the database index. Hash values are calculated from each expression in the database index. The probabilistic detector is populated with the hash values. When a query is received to search the database, hash values are formed from the expressions in the query. A query to search the database can comprise an expression, multiple expressions, or a combination of expressions (for example, a sentence). These hash values (formed from query expressions) are used to query the probabilistic detector. If a match is found, the database is queried utilizing the original query. If no match is found, the database is not queried. As described in more detail below, the nature of the probabilistic detector is such that, if no match is found, the probability of the queried for expression being in the database index is zero per cent. Or, stated differently, the probability that the queried for expression is not in the database index is 100 per cent. This is particularly advantageous when attempting to prevent denial of service attacks based on expressions known not to exist in the database.

Figure 1:
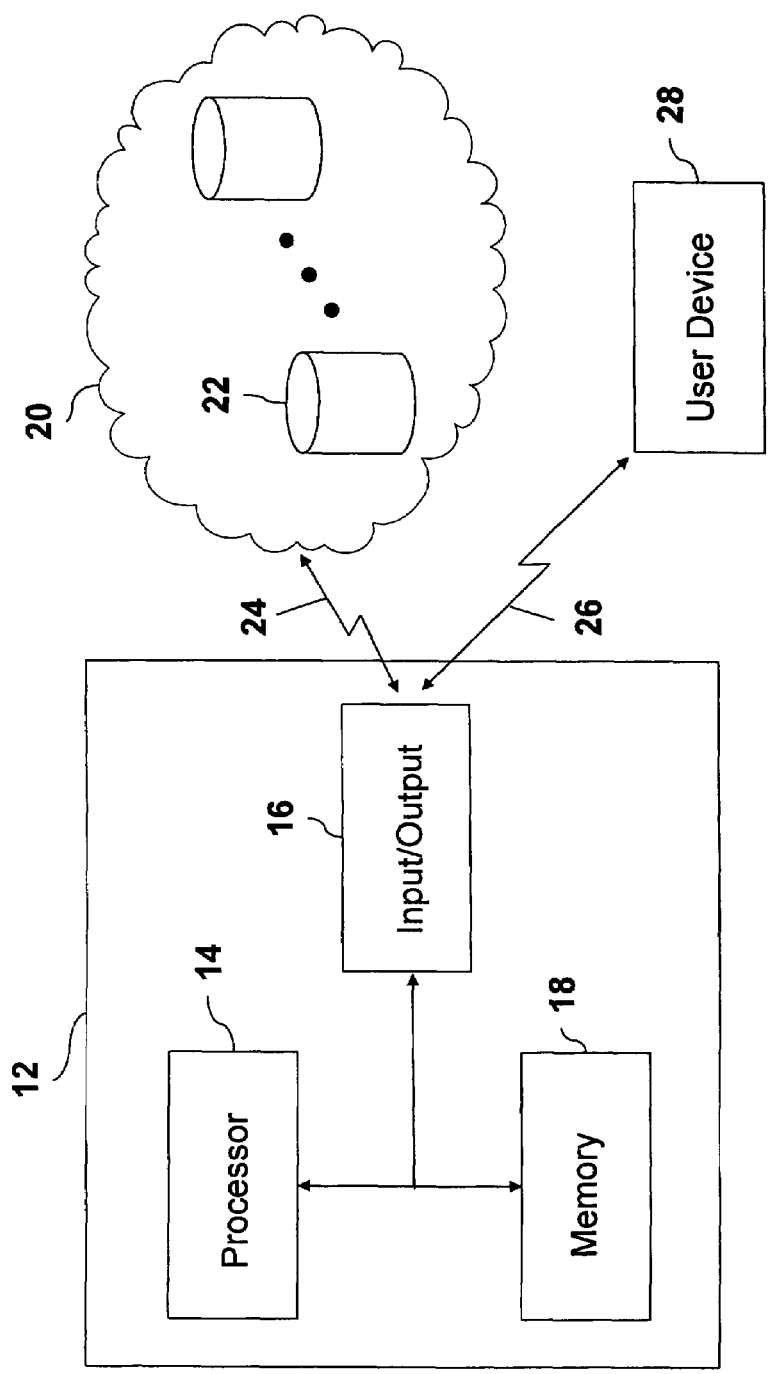
FIG. 1 is an illustration of a computing device for performing searches utilizing a probabilistic detector.

FIG. 1 is an illustration of a computing device 12 for performing a search utilizing a probabilistic detector. The computing device 12 comprises a processing portion 14, an input/output portion 16, and a memory portion 18. It is emphasized that the block diagram depicted in FIG. 1 is exemplary and not intended to imply a specific implementation. For example, the computing device 12 can comprise a processor, a personnel computer, a server computer, a hand held device, a laptop device, a multiprocessor system, a microprocessor based system, a set top box, a programmable consumer electronic device, a network personal computer, a minicomputer, a mainframe computer, a distributed computing environment, or a combination thereof. The computing 12 can be implemented in a single processor, such as a computer, or multiple processors. Multiple processors can be distributed or centrally located. Multiple processors can communicate wirelessly, via hard wire, or a combination thereof. Further, each of the processing portion 14, the input/output portion 16, and the memory portion 18, can comprise any of the devices listed above for the computing device 12, and can be implemented in a single processor or multiple processors as described above. The computing device 12 communicates with database 22 via an interface 24. The interface 24 can be a wireless interface, a wired interface, or a combination thereof. The database 22 is representative of any appropriate storage means. The database 22 can be part of any appropriate system, such as a network 20. It is to be understood that the database 22 is not limited to being incorporated in a network. The database 22 can be incorporated in other systems and devices, such as a processor, a server, semiconductor memory, or a combination thereof, for example.

The input/output portion 16 is capable of receiving requests for information. Requests for information can be received from users via, for example, user device 28 via interface 26. The interface 26 can be a wireless interface, a wired interface, or a combination thereof. In an exemplary embodiment, the interface 26 and the interface 24 are the same interface. The user device 28 can comprise any appropriate device for providing requests and receiving responses from the computing device 12. For example, the user device 28 can comprise a processor, a personnel computer, a server computer, a hand held device, a laptop device, a multiprocessor system, a microprocessor based system, a set top box, a programmable consumer electronic device, a network personal computer, a minicomputer, a mainframe computer, a distributed computing environments, or a combination thereof. The input/output portion 16 also is capable of providing a query for information to the database 22.

The memory portion 18 can comprise any appropriate type of memory. For example, the memory portion 18 can comprise volatile memory, nonvolatile memory, disk memory, semiconductor memory, magnetic memory, optical memory, system memory, cache memory, program memory, or a combination thereof. In an exemplary embodiment, the probabilistic detector is stored in the memory portion 18. The memory portion 18 also can have stored therein an arbitrary portion of the contents of the database 22. The memory portion 18 can also have stored therein an indication of previous search results. For example, previously searched for expressions and/or queries, an indication as to whether the expressions were found, and the results of the previous queries can be stored in the memory portion 18. This can be stored in cache memory for example. As described in more detail below, the previous results can be used to further facilitate searching.

The processor portion 14 computes hash values from search expressions received via the input/output portion 16. The processor 14 also provides queries based on these hash values to the probabilistic detector stored in the memory portion 18. The processor portion 18 analyzes the results of the query of the probabilistic detector and determines if the information being sought is in the index of the database 22. If the results indicate that the information may be in the index of the database 22, the processor portion 14 provides a query, based on the original request, to the database 22, via the input/output portion 18. If the results indicate that the information is not in the index of the database 22, the processor portion 14 does not query the database 22. Optionally, the processor portion 14 can provide an indication to the user via the user device 28, that the information being sought is not in the database 22. In an exemplary embodiment, the processor portion 14 searches the memory portion 18 to determine if current search expressions were previously searched for. If it is determined that a current search expression was previously searched for, and the results indicate that the expression was not found, the processor portion does not query the database 22. The processor portion 14 can optionally provide an indication thereof to the user via the input/output portion 16, via the user device 28. If it is determined that a current search expression was previously searched for, and the results indicate that the expression was found, the processor portion queries the database 22, forgoing the query of the probabilistic detector with hash values based on the current search expressions. Alternatively, if the current search expression was previously searched for, and the results of that previous query are stored in the memory portion 18, the database 22 is not queried and the results are provided to the user.

In an exemplary embodiment, the probabilistic detector is implemented in the form of a Bloom filter. Bloom filters are known in the art. A Bloom filter can be used to determine if an element is in a group of elements. Utilizing a Bloom filter it is possible obtain a false positive. That is, it is possible that the results of the Bloom filter can indicate that an element is in the group, when the element is not in the group. However, it is not possible to obtain a false negative result utilizing a Bloom filter. That is, it is not possible for the Bloom filter to indicate that an element is not in the group, when the element is in the group.

Figure 2:
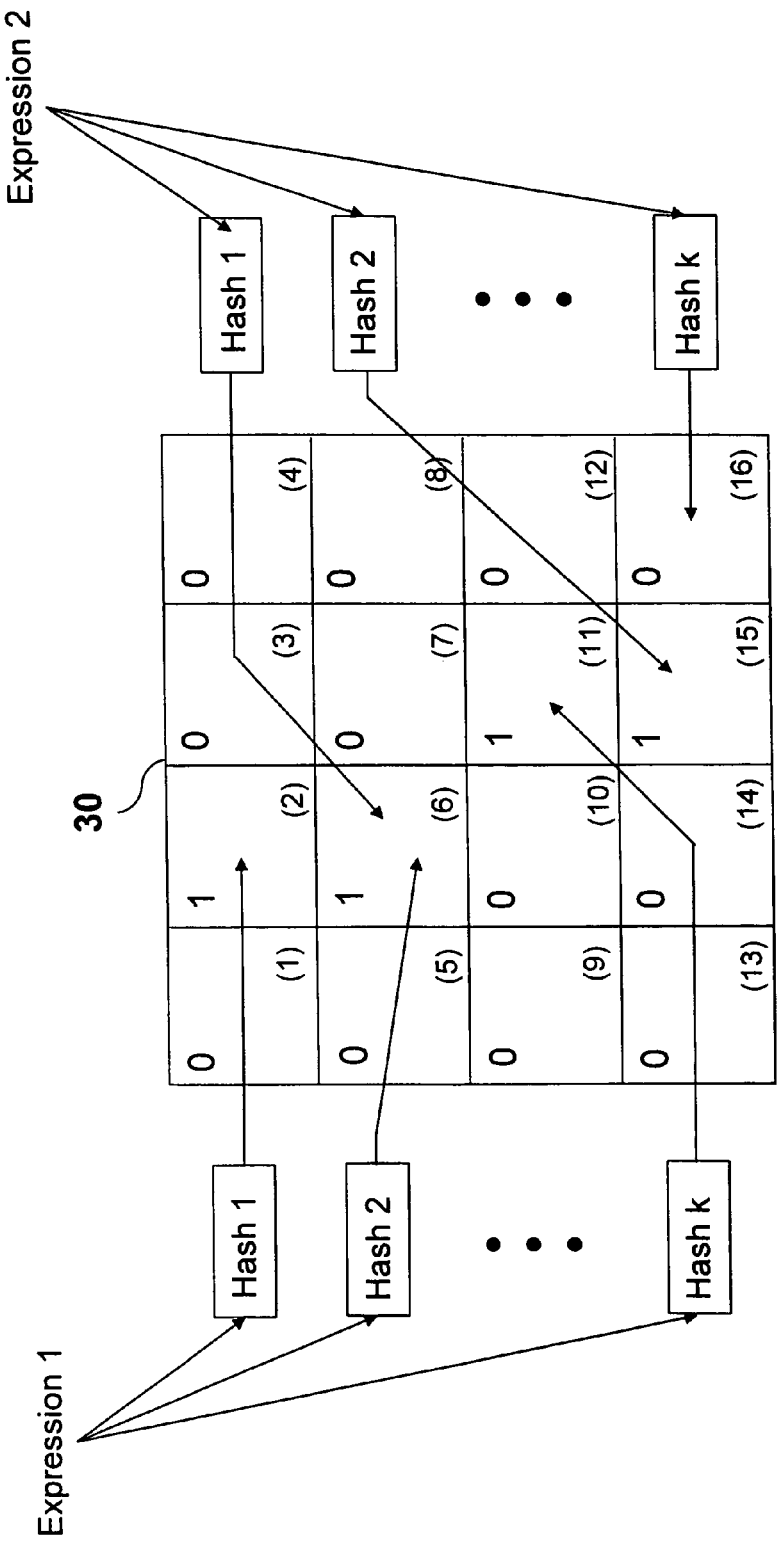
FIG. 2 is an illustration of an exemplary probabilistic detector.

FIG. 2 is an illustration of an exemplary probabilistic detector 30 utilized to perform searches. The probabilistic detector 30 comprises a probabilistic data structure implemented as an array. This depiction is exemplary. The probabilistic detector 30 is depicted as a 4×4 array having 16 elements. Each element location is depicted by the location number in parenthesis in FIG. 2. The probabilistic detector 30 is created by hashing expressions in the database index. Hash functions are known in the art. A hash function is a function that converts a variable length input into a fixed length output, referred to as the hash value. Hash functions are known to have collisions. A collision occurs when two different inputs to a hash function produce an identical hash value.

In an exemplary embodiment, each expression of the database index is hashed using k different hash functions. The k hash functions are implemented such that the possible hash values range from 1 through 16. Thus, each hash value will map into the probabilistic detector 30. Expression 1 represents a first expression from the database index. Expression 1 is operated on by the first hash function, denoted as Hash 1 in FIG. 2. The resulting hash value is mapped into the probabilistic detector 30. In an exemplary embodiment, the probabilistic detector 30 is filled with all binary 0's, and a binary 1 is placed in the appropriate location of probabilistic detector 30. As shown in FIG. 2, the resulting hash value from hashing expression 1 with Hash 1 is equal to 2. Accordingly a binary 1 is placed in location 2 of the probabilistic detector 30. Expression 1 is also operated on by Hash 2, resulting in a hash value equal to 6. Accordingly, a binary 1 is placed in location 6 of the probabilistic detector 30. This process is continued until expression 1 has been operated on by all k hash functions. It is to be understood that this mapping is exemplary. Other mappings can be implemented.

The next expression in the database index, depicted as expression 2 in FIG. 2, is also operated on by the same k hash functions. As shown in FIG. 2, hashing expression 2 with hash function 1 results in a hash value equal to 6. Accordingly, a binary 1 is place in location 6 of the probabilistic detector 30. Note that operating on expression 1 and expression 2 with the same hash function resulted in the same hash value, 6. This is an example of a hash collision. In an exemplary embodiment, all expressions in the database index are hashed with the k hash functions to populate the probabilistic detector 30. In alternate embodiments, various subsets of the expressions in the database index are hashed with the k hash functions to populate the probabilistic detector 30. In an exemplary embodiment, the probabilistic detector 30 comprises 4096 elements and the value of k is 5.

In an exemplary embodiment, eight bits are drawn from the current hash computation and the next input character is used as in index into a table of chosen random values. An exclusive or (XOR) function is performed on the value found in that position and the hash value to produce the hash value of a longer string. Strings of differing lengths are XORed by treating the shorter string as having an initial set of zero bits.

The probability of obtaining false positive results is controllable by varying the size of the table (which affects the range of the hash function), and by changing the number of probes to the table (i.e., the number of hash functions). Increasing the number of functions without increasing the table size leads to higher occupancy because each insertion adds a larger number of bits to the table.

To perform a search (query) utilizing the populated probabilistic detector 30, the search expression is operated on by each of the k hash functions. If any one of the resulting hash values map into a location in the probabilistic detector 30 having a binary 0, than the search expression was not used to populate the probabilistic detector 30, and thus the search expression is not in the database index. If the resulting hash values maps into locations in the probabilistic detector 30, all containing binary 1's, than either the search expression was used to populate the probabilistic detector 30, or another expression caused the locations of the probabilistic detector 30 to have binary 1's stored therein.

Figure 3:
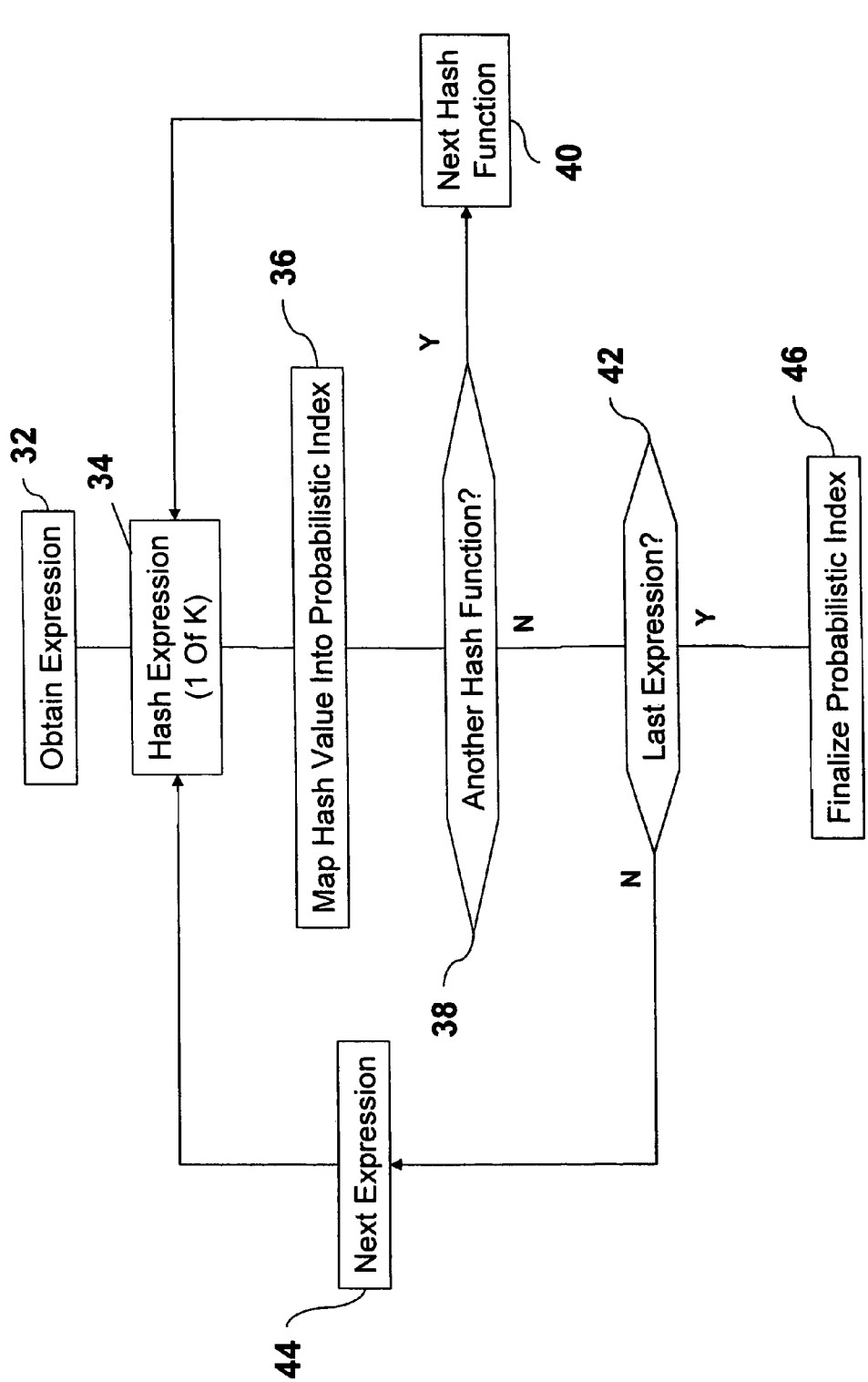
FIG. 3 is a flow diagram of an exemplary process for creating a probabilistic detector.

FIG. 3 is a flow diagram of an exemplary process for creating a probabilistic detector. A first expression of the database index is received at step 32. The first expression is hashed at step 34. The hash value resulting from the hashing operation is mapped into the probabilistic detector at step 36. Mapping the hash value into the probabilistic detector comprises populating the appropriate element (location) with the appropriate value, such as a binary 1 for example. At step 38, it is determined if the expression has been hashed by all k functions. If the expression has not been hashed by all k hash functions, the next hash function is obtained at step 40 and the processes proceeds to step 34 to repeat the process of hashing and mapping until the expression has been hashed by all k hash functions. If the expression has been hashed by all k hash functions (step 38), it is determined at step 42 if there are more expressions in the database index. If no more expressions are in the database index, the probabilistic detector is finalized at step 46. Finalizing the probabilistic detector comprises preparing the probabilistic detector for use for searching. If more expressions exist in the database index (step 42), the next expression is obtain at step 44. The process proceeds to step 34 and continues as described above.

The process depicted in FIG. 3 is exemplary. For example, in an alternate embodiment, the first expression can be hashed by all k hash functions and then the resulting hash values can be mapped to the probabilistic detector. The next expression can then be obtained, and the process repeated until all expressions from the database index have been hashed and mapped.

Figure 4:
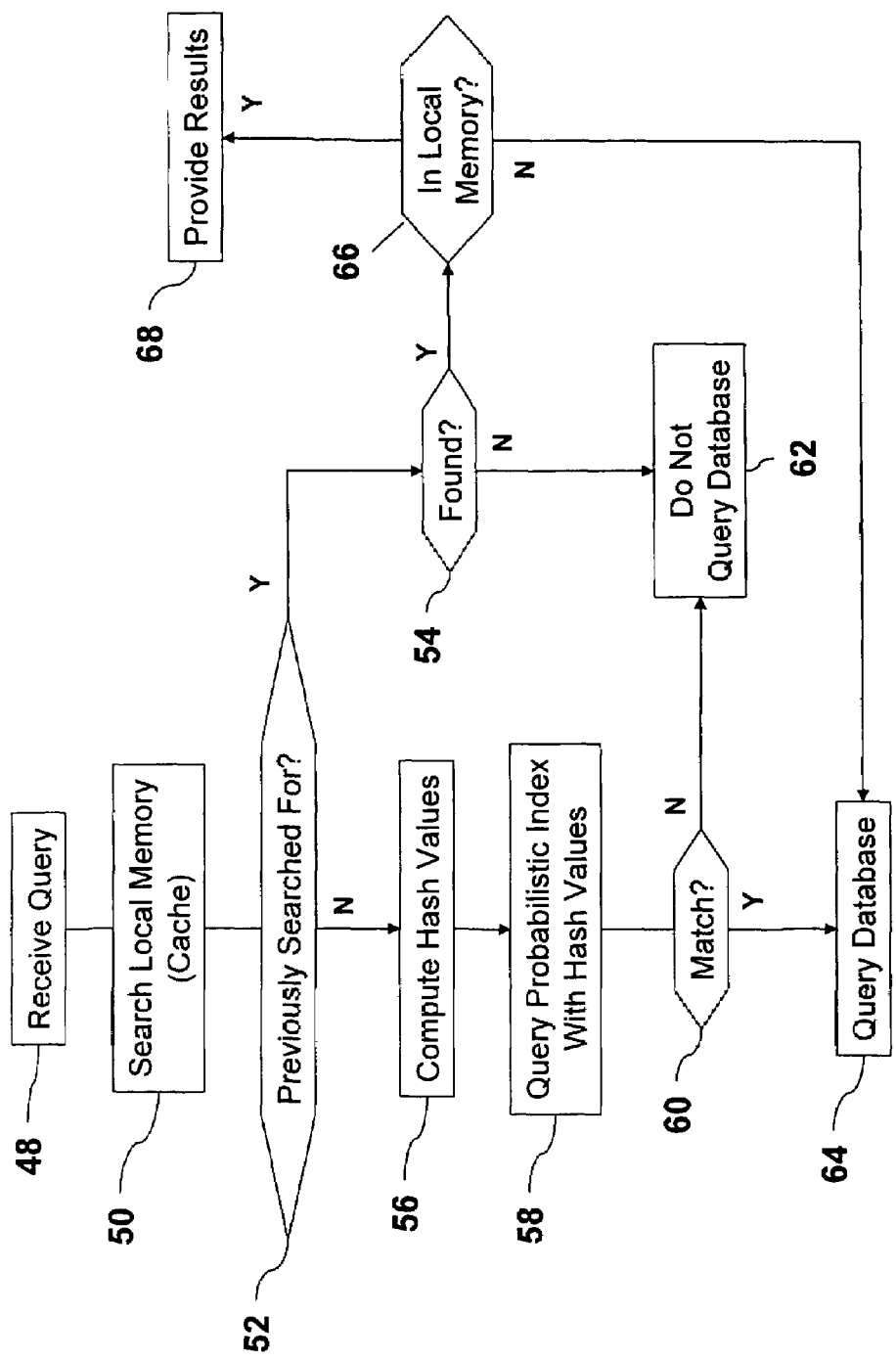
FIG. 4 is a flow diagram of an exemplary process for performing a search utilizing a probabilistic detector.

FIG. 4 is a flow diagram of an exemplary process for performing a search utilizing a probabilistic detector. A query is received at step 48. Optionally, at step 50, local memory, such as a cache memory, can be searched to determine if the queried for information has recently been searched for. If it is determined that the queried for information has recently been searched for (step 52) and not found (step 54), then the database is not queried, as depicted at step 62. If it is determined that the queried for information was searched for (step 52) and found (step 54), it is determined (step 66) if the results of the query are in the local memory. If the results of the query are in the local memory, the results are provided at step 68. If the results or the query are not in the local memory (step 66), the database is queried at step 64, and the steps of computing hash values (step 56) and querying the probabilistic detector (step 58) are not performed. If it is determined that the queried for information was not recently searched for, hash values are computed for the search expressions of the query at step 56. Steps 50, 52, and 54 are optional. Thus, a query can be received at step 48 and hash values can be computed for expressions in the query (step 56) without searching local memory to determine if the queried for information recently has been searched for.

The hash values computed at step 56 are used to query the probabilistic detector at step 58. If a match is found at step 60, the database is queried at step 64 using the original query (i.e., not the hash values). If there is not a match at step 60, the database is not queried as depicted at step 62.

Figure 5:
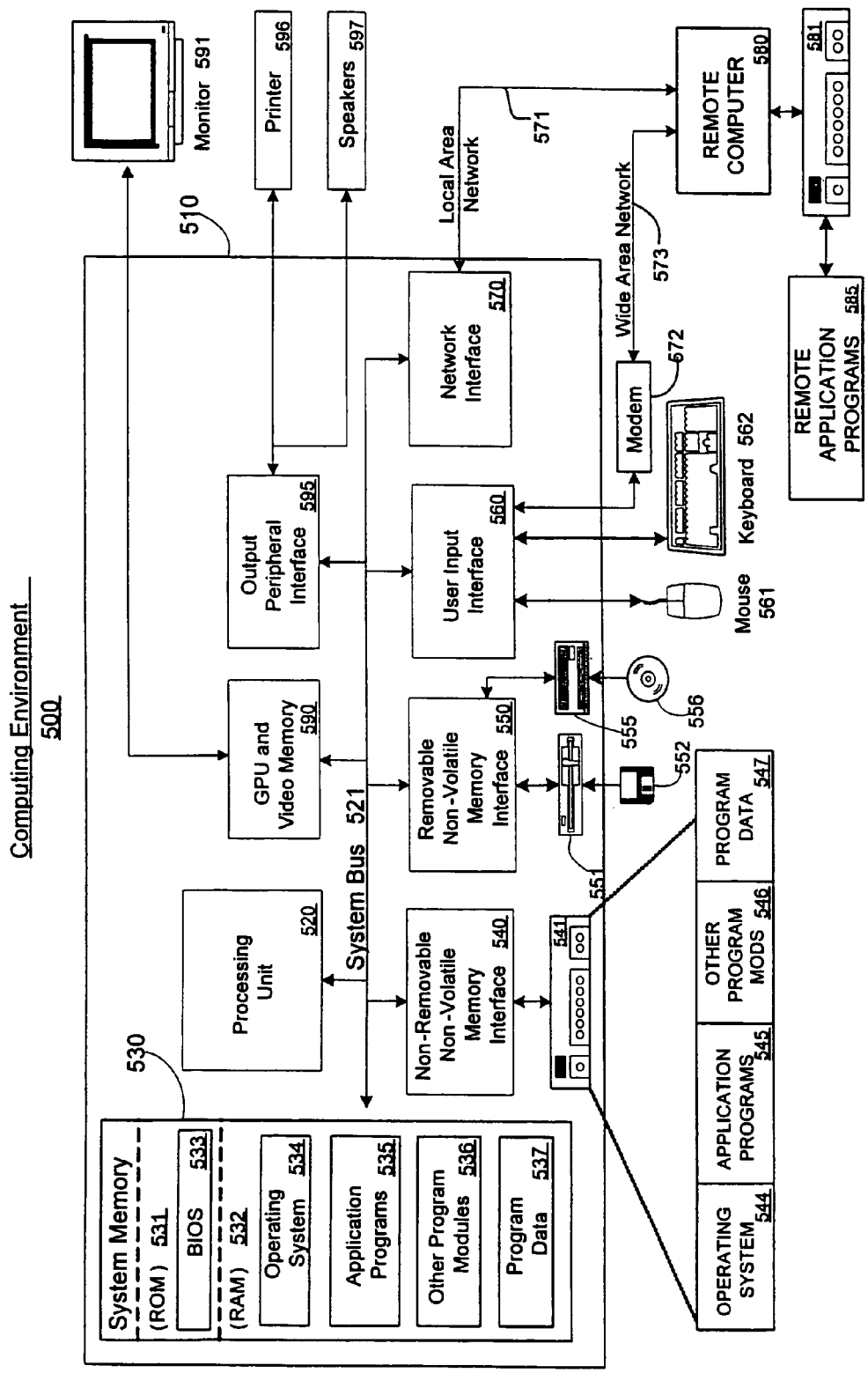
FIG. 5 is an illustration of an example of a suitable computing system environment in which an exemplary embodiment for searching for information utilizing a probabilistic detector can be implemented.

The probabilistic search method and apparatus as described herein are applicable to generic computing environments wherein probabilistic searches can be performed. FIG. 5 illustrates an example of a suitable computing system environment 500 in which an exemplary embodiment for searching for information utilizing a probabilistic detector can be implemented. The computing system environment 500 is only one example of a suitable computing environment and is not intended to suggest any limitation as to the scope of use or functionality. Neither should the computing environment 500 be interpreted as having any dependency or requirement relating to any one or combination of components illustrated in the exemplary operating environment 500.

Searches utilizing a probabilistic detector are operational with numerous other general purpose or special purpose computing system environments or configurations. Examples of well known computing systems, environments, and/or configurations that may be suitable for use include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

A search utilizing a probabilistic detector can be described in the general context of computer-executable instructions, such as program modules, being executed by a computer. Generally, program modules include routines, programs, objects, components, data structures, etc. that perform particular tasks or implement particular abstract data types. A search utilizing a probabilistic detector also can be practiced in distributed computing environments where tasks are performed by remote processing devices that are linked through a communications network or other data transmission medium. In a distributed computing environment, program modules and other data can be located in both local and remote computer storage media including memory storage devices.

With reference to FIG. 5, an exemplary system for implementing a search utilizing a probabilistic detector includes a general purpose computing device in the form of a computer 510. Components of computer 510 may include, but are not limited to, a processing unit 520, a system memory 530, and a system bus 521 that couples various system components including the system memory to the processing unit 520. The system bus 521 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 510 typically includes a variety of computer readable media. Computer readable media can be any available media that can be accessed by computer 510 and includes both volatile and non-volatile media, removable and non-removable media. By way of example, and not limitation, computer readable media may comprise computer storage media and communication media. Computer storage media includes both volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 510. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 530 includes computer storage media in the form of volatile and/or non-volatile memory such as ROM 531 and RAM 532. A basic input/output system 533 (BIOS), containing the basic routines that help to transfer information between elements within computer 510, such as during start-up, is typically stored in ROM 531. RAM 532 typically contains data and/or program modules that are immediately accessible to and/or presently being operated on by processing unit 520. By way of example, and not limitation, FIG. 5 illustrates operating system 534, application programs 535, other program modules 536, and program data 537.

The computer 510 may also include other removable/non-removable, volatile/non-volatile computer storage media. By way of example only, FIG. 5 illustrates a hard disk drive 541 that reads from or writes to non-removable, non-volatile magnetic media, a magnetic disk drive 551 that reads from or writes to a removable, non-volatile magnetic disk 552, and an optical disk drive 555 that reads from or writes to a removable, non-volatile optical disk 556, such as a CD-ROM or other optical media. Other removable/non-removable, volatile/non-volatile computer storage media that can be used in the exemplary operating environment include, but are not limited to, magnetic tape cassettes, flash memory cards, digital versatile disks, digital video tape, solid state RAM, solid state ROM, and the like. The hard disk drive 541 is typically connected to the system bus 521 through a non-removable memory interface such as interface 540, and magnetic disk drive 551 and optical disk drive 555 are typically connected to the system bus 521 by a removable memory interface, such as interface 550.

The drives and their associated computer storage media provide storage of computer readable instructions, data structures, program modules and other data for the computer 510. In FIG. 5, for example, hard disk drive 541 is illustrated as storing operating system 544, application programs 545, other program modules 546, and program data 547. Note that these components can either be the same as or different from operating system 534, application programs 535, other program modules 536, and program data 537. Operating system 544, application programs 545, other program modules 546, and program data 547 are given different numbers here to illustrate that, at a minimum, they are different copies.

A user may enter commands and information into the computer 510 through input devices such as a keyboard 562 and pointing device 561, commonly referred to as a mouse, trackball or touch pad. Other input devices (not shown) may include a microphone, joystick, game pad, satellite dish, scanner, or the like. These and other input devices are often connected to the processing unit 520 through a user input interface 560 that is coupled to the system bus, but may be connected by other interface and bus structures, such as a parallel port, game port or a universal serial bus (USB).

A monitor 591 or other type of display device is also connected to the system bus 521 via an interface, such as a video interface, which may comprise a graphics processing unit (GPU) and video memory 590. In addition to the monitor, computers may also include other peripheral output devices such as speakers 597 and printer 596, which may be connected through an output peripheral interface 595.

The computer 510 may operate in a networked environment using logical connections to one or more remote computers, such as a remote computer 580. The remote computer 580 may be a personal computer, a server, a router, a network PC, a peer device or other common network node, and typically includes many or all of the elements described above relative to the computer 510, although only a memory storage device 581 has been illustrated in FIG. 5. The logical connections depicted include a LAN 571 and a WAN 573, but may also include other networks. Such networking environments are commonplace in offices, enterprise-wide computer networks, intranets and the internet.

When used in a LAN networking environment, the computer 510 is connected to the LAN 571 through a network interface or adapter 570. When used in a WAN networking environment, the computer 510 typically includes a modem 572 or other means for establishing communications over the WAN 573, such as the internet. The modem 572, which may be internal or external, may be connected to the system bus 521 via the user input interface 560, or other appropriate mechanism. In a networked environment, program modules depicted relative to the computer 510, or portions thereof, may be stored in the remote memory storage device. By way of example, and not limitation, FIG. 5 illustrates remote application programs 585 as residing on memory device 581. It will be appreciated that the network connections shown are exemplary and other means of establishing a communications link between the computers may be used.

As mentioned above, while exemplary embodiments have been described in connection with various computing devices, the underlying concepts may be applied to any computing device or system capable of performing a search utilizing a probabilistic detector.

The various techniques described herein may be implemented in connection with hardware or software or, where appropriate, with a combination of both. Thus, the methods and apparatus for performing a search utilizing a probabilistic detector, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for performing a search utilizing a probabilistic detector. In the case of program code execution on programmable computers, the computing device will generally include a processor, a storage medium readable by the processor (including volatile and non-volatile memory and/or storage elements), at least one input device, and at least one output device. The program (s) can be implemented in assembly or machine language, if desired. In any case, the language may be a compiled or interpreted language, and combined with hardware implementations.

The methods and apparatus for performing a search utilizing a probabilistic detector can also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for performing a search utilizing a probabilistic detector. When implemented on a general-purpose processor, the program code combines with the processor to provide a unique apparatus that operates to invoke the functionality searching utilizing a probabilistic detector. Additionally, any storage techniques used in connection with searching utilizing a probabilistic detector can invariably be a combination of hardware and software.

While searching utilizing a probabilistic detector has been described in connection with the illustrative embodiments of the various figures, it is to be understood that other similar embodiments may be used or modifications and additions may be made to the described embodiments for performing the same function of searching utilizing a probabilistic detector without deviating therefrom. Therefore, searching utilizing a probabilistic detector should not be limited to any single embodiment, but rather should be construed in breadth and scope in accordance with the appended claims.

What is claimed:

1. A method for mitigating denial of service attacks against and improving performance of an Internet search system, said method comprising:
   receiving a request for information;
   searching, with said request instead of a hash value based on said request, a first memory for an indication as to whether said information is in a second memory, wherein said first memory stores previous requests for information;
   if a result of searching said first memory is indicative of said information being in said second memory and said information is in said first memory, providing said information from said first memory;
   if said result of searching said first memory is indicative of said information being in said second memory and said information is not in said first memory, querying said second memory, with said request, for said information;
   if said result of searching said first memory is indicative of said information not being in said second memory, forgoing a query of said second memory;
   if on a condition that said result of searching said first memory is indicative of said request not being in said first memory:
      computing at least one hash value based on said request;
      querying with said at least one hash value a probabilistic detector, wherein said probabilistic detector is populated with at least one computed hash value based on each expression in an index of said second memory, for an indication as to whether said information is in said second memory;
      determining if said queried for indication is indicative of said information being in said second memory; and
      if said queried for indication is indicative of said information being in said second memory, querying with said request, and not with the at least one hash value based on said request, said second memory for said information.

2. A method in accordance with claim 1, further comprising the act of creating said probabilistic detector.

3. A method in accordance with claim 1, wherein said probabilistic detector comprises a Bloom filter.

4. A method in accordance with claim 1, wherein said first memory comprises local memory.

5. A method in accordance with claim 1, wherein said second memory comprises a plurality of distributed databases.

6. A system for mitigating denial of service attacks against and improving performance of an Internet search system, said system comprising:
   an input/output portion for:
   receiving a request for information, said request comprising at least one search expression; and
   a memory portion, wherein said memory portion stores previous requests for information; and
   a processor portion for:
      searching, with said at least one search expression instead of a hash value based on said at least one search expression, said memory portion for an indication as to whether said information is in external memory;
      if a result of searching said memory portion is indicative of said information being in said external memory and said information is in said memory portion, providing said information from said memory portion;
      if said result of searching said memory portion is indicative of said information being in said external memory and said information is not in said memory portion, querying with said at least one search expression via said input/output portion said external memory for said information; and
      if said result of searching said memory portion is indicative of said information not being in said external memory, forgoing a query of said external memory;
      if on a condition that said result of searching said memory portion is indicative of said at least one search expression not being in said memory portion:
         computing at least one hash value based on said at least one search expression;
         querying with said at least one hash value a probabilistic detector, wherein said probabilistic detector is populated with at least one computed hash value based on each expression in an index of said external memory, for an indication as to whether said information is in said external memory;
         determining if said queried for indication is indicative of said information being in said external memory; and
         if said queried for indication is indicative of said information being in said external memory, querying with said at least one search expression, and not with the at least one hash value based on said at least one search expression, said external memory for said information.

7. A system in accordance with claim 6, wherein said external memory comprises at least one database.

8. A system in accordance with claim 6, wherein:

said memory portion comprises a probabilistic detector; and said processor portion is capable of querying with said at least one hash value said probabilistic detector for said indication.

9. A system in accordance with claim 8, said processor portion further for creating said probabilistic detector.

10. A system in accordance with claim 8, wherein said probabilistic detector comprises a Bloom filter.

11. A system in accordance with claim 6, wherein said memory portion comprises local memory.

12. A computer-readable storage medium having computer-executable instructions for performing a method useful to counter denial of service attacks against and improve performance of an Internet search system comprising the acts of:

receiving a request for information, said request comprising at least one search expression;

responsive to receiving said request for information, searching, with said at least one search expression instead of a hash value based on said at least one search expression, a first memory for an indication as to whether said information is in a second memory, wherein said first memory stores previous requests for information;

if searching said first memory results in an indication that said information is in said second memory and said information is in said first memory, providing said information from said first memory;

if searching said first memory results in an indication that said information in said second memory and said information is not in said first memory, querying with said at least one search expression said second memory for said information; and if searching said first memory results in an indication that said information is not in said second memory, forgoing a query of said second memory;

if on a condition that said result of searching said first memory is indicative of said at least one search expression not being in said first memory:

computing at least one hash value based on said at least one search expression;

querying with said at least one hash value a probabilistic detector, wherein said probabilistic detector is populated with at least one computed hash value based on each expression in an index of said second memory, for an indication as to whether said information is in said second memory;

determining if said queried for indication is indicative of said information being in said second memory; and if said queried for indication is indicative of said information being in said second memory, querying with said at least one search expression, and not with the at least one hash value based on said at least one search expression, said second memory for said information.

13. A computer-readable storage medium in accordance with claim 12, said computer-readable medium having further computer-executable instructions for creating said probabilistic detector.

14. A computer-readable storage medium in accordance with claim 13, wherein said probabilistic detector comprises a Bloom filter.

15. A computer-readable storage medium in accordance with claim 12, wherein said first memory comprises non-volatile memory.

16. A computer-readable storage medium in accordance with claim 15, wherein said probabilistic detector is stored in distributed memory.

* * * * *